United States Patent [19]

Hein

[11] Patent Number: 5,270,366
[45] Date of Patent: Dec. 14, 1993

[54] LEAD STABILIZED, FLEXIBLE POLYMERIC BLENDS CONTAINING POLYVINYLCHLORIDE

[75] Inventor: Marc D. Hein, Austin, Tex.

[73] Assignee: Vista Chemical Company, Houston, Tex.

[21] Appl. No.: 991,322

[22] Filed: Dec. 16, 1992

[51] Int. Cl.$^5$ .......................... C08K 5/521; C08K 3/32
[52] U.S. Cl. ...................... 524/145; 524/399; 524/417
[58] Field of Search ............... 525/220, 231; 524/145, 524/417, 399

[56] References Cited

U.S. PATENT DOCUMENTS

| | | |
|---|---|---|
| 3,156,744 | 11/1964 | Mullins . |
| 3,553,348 | 1/1971 | Betts . |
| 3,684,778 | 8/1972 | Hammer . |
| 3,780,140 | 12/1973 | Hammer . |
| 3,905,927 | 9/1975 | Anderson .......................... 524/399 |
| 4,137,382 | 1/1979 | Vetter .............................. 525/368 |
| 4,294,752 | 10/1981 | Silberberg . |
| 4,489,193 | 12/1984 | Goswami ......................... 525/231 |
| 4,613,533 | 9/1986 | Loomis et al. . |
| 4,627,993 | 12/1986 | Loomis . |

FOREIGN PATENT DOCUMENTS

| | | |
|---|---|---|
| 787217 | 8/1972 | Belgium . |
| 53-039338 | 4/1978 | Japan . |
| 53-118448 | 10/1978 | Japan . |
| 63-077960 | 4/1988 | Japan . |

OTHER PUBLICATIONS

Valeev, A. F.; Biryukov, V. P.; Mikhailov, B. M.; "Effect of Some Metal-Containing Compounds on the Thermal Stability of Poly(vinyl chloride) in the Presence of Phosphoric Acid Esters", Nov. Razrab. v Obl. Pr-va Iskusstv. Kozh i Plenoch. Mater., M. 118-21.

Primary Examiner—Veronica P. Hoke
Attorney, Agent, or Firm—Browning, Bushman, Anderson & Brookhart

[57] ABSTRACT

A flexible, lead-stabilized polymeric blend comprising polyvinylchloride, an ethylene copolymer and an alkyl acid phosphate, phosphoric acid or mixtures thereof, the formulation being resistant to lead-cation-induced cross-linking of the ethylene terpolymer.

9 Claims, No Drawings

LEAD STABILIZED, FLEXIBLE POLYMERIC BLENDS CONTAINING POLYVINYLCHLORIDE

BACKGROUND OF THE INVENTION

1. Field of the Invention

The present invention relates to polymeric blends of polyvinylchloride. More particularly, the present invention relates to flexible blends of polyvinylchloride and ethylene terpolymers that exhibit improved stability and processibility.

2. Brief Description of the Prior Art

Blends of polyvinylchloride with other polymeric materials are widely used in a variety of applications such as coatings and jacketings for wire and cable, roofing membranes, etc. In particular, blends of polyvinylchloride with ethylene copolymers such as terpolymers of ethylene, carbon monoxide and polymerizable esters such as vinyl acetate, methyl acrylate, butyl acrylate and the like are known.

In formulating polyvinylchloride (PVC) blends for use in such applications as wire and cable coating and jacketing, lubricants, generally consisting of one or more compounds, are incorporated into the blends to facilitate the processing of the blends by improving flow properties and stability of the polymer melt. The lubricants also minimize adherence of the molten polymer to machine surfaces during compounding and processing. A wide variety of such materials are commonly used as lubricants or lubricant packages. For example, fatty acids and their metal salts, paraffin wax, oxidized polyethylene wax, fatty acid esters, fatty acid amides, to name a few, have all been used in such PVC blends.

It is also common in flexible PVC formulations or blends, e.g., for wire and cable applications, to incorporate stabilizers to impart electrical insulation resistance and long-term thermal and processing stability. In particular, lead-based stabilizers such as lead phthalate are widely used in flexible PVC formulations. Such stabilizers, in addition to being cheaper than tin and barium/zinc-based stabilizers, provide superior performance as to electrical insulation resistance and long-term thermal and processing stability.

One problem associated with use of lead-based stabilizers in PVC blends containing ethylene terpolymers such as those discussed above is the tendency of the lead stabilizers to catalyze the cross-linking of the ethylene terpolymer. Such cross-linking impairs the processibility of the blends in that it results in large increases in viscosity during processing, e.g., extrusion, reducing the thermal stability and deleteriously affecting the flow properties of the polymer melt.

SUMMARY OF THE INVENTION

It is therefore an object of the present invention to provide an improved flexible, polymeric blend of polyvinylchloride and an ethylene terpolymer.

Another object of the present invention is to provide a lead-stabilized blend of polyvinylchloride and an ethylene terpolymer that inhibits or retards lead-induced cross-linking of the terpolymer, thus increasing the stability and processibility of the blend.

The above and other objects of the present invention will become apparent from the description given herein and the appended claims.

In accordance with the objects of the present invention, there is provided a flexible, stabilized polymeric blend comprising polyvinylchloride, a terpolymer of ethylene, carbon monoxide, and a copolymerizable monomer selected from the group consisting of esters of unsaturated mono- or dicarboxylic acids of 2 to 20 carbon atoms, vinyl esters of saturated carboxylic acids wherein the acid group has from 1–18 carbon atoms and mixtures thereof, an effective amount of a lead stabilizer and an inhibitor selected from the class consisting of phosphoric acid, alkyl acid phosphates and mixtures thereof, the pH of a 1 percent by weight dispersion of the alkyl acid phosphate in deionized water having a pH of from about 2 to about 3.

DESCRIPTION OF THE PREFERRED EMBODIMENTS

The flexible, stabilized blends of the present invention contemplate the inclusion of two main polymeric ingredients, namely polyvinylchloride and an ethylene terpolymer. The expression "polyvinylchloride" as used herein includes homopolymers of vinyl chloride as well as copolymers of vinyl chloride containing up to 20% of other monomers such as vinyl acetate, propylene, ethylene, butylvinyl ether, dimethyl maleate, dimethyl fumarate, etc. It is also contemplated that chlorinated polyvinylchloride is included within the definition of polyvinylchloride as used herein. The PVC can be produced by mass or suspension polymerization processes. Generally speaking, the polyvinylchloride will be present in the blends of the present invention in amounts of from about 10 to about 90, preferably from about 10 to about 50, parts per hundred of total resin (phr) wherein the term "total resin" refers to the total combined amount of the polyvinylchloride and the ethylene terpolymer.

The ethylene terpolymers that are used in the blends of the present invention comprise from about 40% to about 80% ethylene, from about 3% to about 30% carbon monoxide, and from about 5% to about 60% of a copolymerizable monomer selected from the group consisting of esters of unsaturated mono- or dicarboxylic acids of 2 to 20 carbon atoms, vinyl esters of saturated carboxylic acids wherein the acid group has from 1-18 carbon atoms and mixtures thereof. Non-limiting examples of such copolymerizable monomers include, without limitation, ethyl acrylate, propyacrylate, butyacrylate, vinyl acetate, vinyl propionate, etc. Especially preferred copolymerizable monomers include butyl acrylate and vinyl acetate. Thus, terpolymers of ethylene, carbon monoxide and vinyl acetate or terpolymers of ethylene, carbon monoxide and butyl acrylate can be used to formulate especially desirable blends according to the present invention. The latter two ethylene terpolymers are commercially available products sold under the names VANAC and ELVALOY, respectively, by du Pont Polymers. Generally speaking, the ethylene terpolymers will be present in the blends in an amount of from about 10 to about 90 phr.

As noted above, the blends or compositions of the present invention are lead-stabilized. The lead stabilizer will be present in the blends of the present invention in amounts of from about 2 to about 15 phr, amounts of from about 3 to about 5 phr being especially preferred. Non-limiting examples of suitable lead stabilizers that can be employed include lead salts of carboxylic acids such as lead phthalate, lead adipate, lead azelate, lead sebacate and lead trimellitate, as well as compounds such as lead sulfate, lead phosphate, etc. Generally speaking, any lead-based stabilizer commonly used in PVC blends can be employed in the compositions of the present invention.

The remaining necessary component of the blends of the present invention is phosphoric acid or an alkyl acid phosphate, referred to herein as "inhibitors" since they act to inhibit lead induced cross-linking. Alkyl acid phosphates are commonly used as release agents for rubbers and elastomers. Generally speaking, the alkyl acid phosphates that are useful will have the general formula

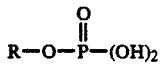

wherein R is an organic radical, especially a residue of an aliphatic or aromatic alcohol, a fatty acid, etc., containing from about 6 to about 20 carbon atoms, the organic radical preferably being an alkyl group containing from about 6 to about 20 carbon atoms, especially from about 8 to about 16 carbon atoms. Non-limiting examples of such alkyl acid phosphate include unneutralized fatty alcohol acid phosphates sold under the name Vanfre UN by R. T. Vanderbilt Co. Inc. or Zelec UN by du Pont Company, a complex organic alkyl acid phosphate sold under the name Garfac by GAF Corporation and lauryl acid phosphate sold under the name Servoxyl VPAZ-100 by Servo Chemische Fabriek B.V. These alkyl acid phosphates are generally complex mixtures that may best be characterized as being a reaction product of phosphoric acid and an organic compound that contains an alkyl group having from about 6 to about 20 carbon atoms. Being complex mixtures, the alkyl acid phosphate may contain starting and/or decomposition materials such as fatty acids or alcohol, phosphoric acid, dialkyl phosphates, etc. The alkyl acid phosphates useful in the blends of the present invention are also characterized by being acidic to the extent that the pH of a 1 percent by weight dispersion of the acid phosphate in deionized water will range from about 2 to about 3. The alkyl acid phosphates will be present in the blends of the present invention in an amount of from about 0.1 to about 3 phr.

A desirable ingredient of the blends of the present invention is a lubricant, primarily a fatty acid (the term "fatty acid" including salts thereof) containing from about 14 to about 22 carbon atoms. Non-limiting examples of suitable lubricants include stearic acid and its salts, palmitic acid and its salts, myristic acid and its salts, etc. Such lubricants can be used in essentially their pure form, e.g., stearic acid, in mixtures, e.g., stearic acid and sodium palmitate, or can be present in naturally occurring extracts or derivatives such as tallow, tall oil, etc. Generally speaking, the lubricant, when used, will be present in an amount of from about 0.1 to about 3 phr.

It will be appreciated that the blends of the present invention can also incorporate other ingredients commonly found in PVC blends such as extenders, lubricants, heat stabilizers, antioxidants, plasticizers, flame retardants, etc.

The blends of the present invention may be used in any application where it is desirable to have a stabilized, flexible resin such as in wire and cable coating and jacketing, films, seals and gaskets, sheet liners, etc.

An unexpected feature of the unique blends of the present invention is that the combination of the lubricant and the alkyl acid phosphates retards cross-linking of the ethylene terpolymer by the lead-based stabilizers. This prevents a common problem encountered in lead-stabilized PVC compositions of a large increase in melt viscosity and a subsequent reduction in stability and processibility when such PVC blends are being processed, e.g., extruded, molded, etc.

To more fully illustrate the present invention, the following non-limiting examples are presented. In Examples 1 and 2 that follow, the compounding of samples was done by hand-blending all the ingredients, 25 percent by weight of the ethylene terpolymer initially being added to the formulations. The hand-blend was initially fused on a roll mill at 340° F. and mixed for 2 minutes after banding. The remaining 75 percent by weight of the ethylene terpolymer was then added to the melt and mixed for an additional 5 minutes. Samples were then pelletized prior to testing.

Capillary rheometer results were obtained using an Instron constant speed capillary rheometer at 185° C. The capillary diameter was 0.1273 cm and the length was 5.0894 cm. The plunger diameter was 0.9525 cm. Torque rheometer data was obtained using a Brabender PL-2000 Plasti-corder equipped with a 500 Haake mixing bowl. Temperatures were set at 185° C. and the batch charges of pre-compounded pellets were 65 g. Torque rheometer data was obtained at 85 rpm except where noted.

EXAMPLE 1

A variety of blends using different lubricants were evaluated using capillary and torque rheometry testing as described above. The compositions of the various blends are shown in Table 1 below.

Capillary rheometer testing results on the blends listed in Table 1 are shown in Table 2 below.

Torque rheometry test results of the blends listed in Table 1 are shown in Table 3 below.

As can be seen from viewing the results in Table 2, only minor differences are exhibited in the apparent viscosity of the various blends. As can be seen, the blend containing oxidized polyethylene wax (467-1971) had the highest apparent viscosity while the blends having the glycerine-based esters (467-197H) and alkyl acid phosphates (467-197P) had the lowest apparent viscosity at the highest shear rates. It was observed that rough surfaces were obtained in the extruded cords at the higher shear rates except in the case of the blends containing the alkyl acid phosphates.

With respect to Table 3, it can be seen that the blends employing the glycerine-based esters and the alkyl acid phosphate had the longest degradation times, the blend containing the alkyl acid phosphate exhibiting a slightly lower viscosity.

It was apparent that the blends containing the alkyl acid phosphate in combination with stearic acid improved the melt flow and metal release better than any of the other lubricants.

EXAMPLE 2

Blends employing lead, tin, barium/zinc stabilizers with various lubricant packages were prepared according to the compounding procedure set out above. The formulations for the blends containing lead stabilizers, tin stabilizers and barium/zinc stabilizers are shown in Tables 4, 5 and 6, respectively.

Torque rheometer data was obtained on the blends set forth in Tables 4–6 according to the rheometer testing procedure set out above. The results for the lead-, tin- and barium/zinc-stabilized blends are shown in Table 7 below.

TABLE 1

| | Sample No. 467-197 | | | | | | | |
|---|---|---|---|---|---|---|---|---|
| Ingredient | I | J | K | L | M | N | O | P |
| Vista 5415 PVC[1] | 100 | 100 | 100 | 100 | 100 | 100 | 100 | 100 |
| ELVALOY ® EP 4015[2] | 75 | 75 | 75 | 75 | 75 | 75 | 75 | 75 |
| Omya UFT (CaCO$_3$)[3] | 8 | 8 | 8 | 8 | 8 | 8 | 8 | 8 |
| Antimony Oxide (Sb$_2$O$_3$) | 5 | 5 | 5 | 5 | 5 | 5 | 5 | 5 |
| Irganox 1010[4] | 0.5 | 0.5 | 0.5 | 0.5 | 0.5 | 0.5 | 0.5 | 0.5 |
| Dythal XL (Pb phthalate)[5] | 6 | 6 | 6 | 6 | 6 | 6 | 6 | 6 |
| Stearic Acid | 1 | 1 | 1 | 1 | 1 | 1 | 1 | 1 |
| AC 629A (oxid. PE wax)[6] | 0.5 | — | — | — | — | — | — | — |
| Rheolube 165 (paraffin wax)[7] | — | 0.5 | — | — | — | — | — | — |
| Aldo MS-LG-FG (glycerin-base esters)[8] | — | — | 0.5 | — | — | — | — | — |
| Hoechst Wax E (amide wax)[9] | — | — | — | 0.5 | — | — | — | — |
| Loxiol G70S (fatty acid esters)[10] | — | — | — | — | 0.5 | — | — | — |
| Acrawax C (N,N'-ethylenebisstearamide)[11] | — | — | — | — | — | 0.5 | — | — |
| Struktol TR016 (fatty acid esters)[12] | — | — | — | — | — | — | 0.5 | — |
| VANFRE* UN (phosphate ester)[13] | — | — | — | — | — | — | — | 0.5 |

[1] Marketed by Vista Chemical Company.
[2] Terpolymer of ethylene (approximately 55% by wt.), carbon monoxide (15% by wt.) and butyl acrylate (30% by wt.) marketed by du Pont.
[3] Marketed by Omya, Inc., a Pluess-Staufer Company, Proctor, Vermont.
[4] Tetrakis (methylene (3,5-di-tert-butyl-4-hydroxyhydrocinnamate)) methane marketed by Ciba-Geigy Corp., Hawthorne, New York.
[5] Marketed by Anxon, inc., Philadelphia, Pennsylvania.
[6] Marketed by Allied-Signal, Inc., Morristown, New Jersey.
[7] Marketed by Rheochem Manufacturing Co., Inc., Warren, New Jersey.
[8] Marketed by Lonza, Fairlawn, New Jersey.
[9] Marketed by Hoechst Celanese Corp., Sommerville, New Jersey.
[10] Marketed by Henkel Corp., Minneapolis, Minnesota.
[11] Marketed by Lonza, Fairlawn, New Jersey.
[12] Marketed by Struktol Company, Stow, Ohio.
[13] Marketed by Z. T. Vanderbilt Company, Inc., Norwalk, Connecticut.

TABLE 2

| Formulation | Shear Rate (sec$^{-1}$) | Apparent Viscosity (cP) |
|---|---|---|
| 467-197I | 11.7 | 1251.7 |
| | 35.2 | 651.31 |
| | 117.3 | 337.36 |
| 467-197J | 11.7 | 1106.7 |
| | 35.2 | 623.32 |
| | 117.3 | 312.93 |
| 467-197K | 11.7 | 1114.4 |
| | 35.2 | 595.34 |
| | 117.3 | 286.98 |
| 467-197L | 11.7 | 1068.6 |
| | 35.2 | 615.69 |
| | 117.3 | 308.35 |
| 467-197M | 11.7 | 1053.3 |
| | 35.2 | 595.34 |
| | 117.3 | 296.14 |
| 467-197N | 11.7 | 1083.8 |
| | 35.2 | 605.51 |
| | 117.3 | 314.46 |
| 467-197O | 11.7 | 1099.1 |
| | 35.2 | 590.25 |
| | 117.3 | 299.19 |
| 467-197P | 11.7 | 1122.0 |
| | 35.2 | 585.16 |
| | 117.3 | 265.61 |

TABLE 3

| Formulation | Degradation Time (sec) | Equilibrium Torque (m-g) |
|---|---|---|
| 467-197I | 516 | 1867 |
| 467-197J | 510 | 1800 |
| 467-197K | 588 | 1733 |
| 467-197L | 516 | 1833 |
| 467-197M | 504 | 1833 |
| 467-197N | 516 | 1733 |
| 467-197O | 528 | 1800 |
| 467-197P | 588 | 1683 |

TABLE 4

| | Sample No. 618-121 | | | |
|---|---|---|---|---|
| Ingredients | A | B | C | D |
| Vista 5395 PVC[1] | 100 | 100 | 100 | 100 |
| ELVALOY ® EP 4015 | 75 | 75 | 75 | 75 |
| Bisphenol A | 0.5 | 0.5 | 0.5 | 0.5 |
| Dythal XL | 6 | 6 | 6 | 6 |
| Stearic Acid | 1.0 | 1.0 | 1.0 | 1.0 |
| H$_3$PO$_4$ | 0.5 | — | — | — |
| VANFRE* UN | — | 0.5 | — | — |
| Bis(2-ethylhexyl) hydrogen phosphate | — | — | 0.5 | — |
| Tris(2-ethylhexyl) phosphate | — | — | — | 0.5 |

[1] Marketed by Vista Chemical Company

TABLE 5

| | Sample No. 618-125 | | | | | | | |
|---|---|---|---|---|---|---|---|---|
| Ingredient | A | B | C | D | E | F | G | H |
| Vista 5415 PVC | 100 | 100 | 100 | 100 | 100 | 100 | 100 | 100 |
| ELVALOY ® EP 4015 | 75 | 75 | 75 | 75 | 75 | 75 | 75 | 75 |
| Bisphenol A | 0.5 | 0.5 | 0.5 | 0.5 | 0.5 | 0.5 | 0.5 | 0.5 |
| Advastab TM-181 (Sn mercaptide)[1] | 3 | 3 | 3 | 3 | — | — | — | — |
| Atlastab 777 (Sn carboxylate)[2] | — | — | — | — | 3 | 3 | 3 | 3 |
| Stearic Acid | 1 | 1 | 1 | 1 | 1 | 1 | 1 | 1 |
| H$_3$PO$_4$ | 0.5 | — | — | — | 0.5 | — | — | — |
| VANFRE* UN | — | 0.5 | — | — | — | 0.5 | — | — |
| Bis(2-ethylhexyl)hydrogen phosphate | — | — | 0.5 | — | — | — | 0.5 | — |

TABLE 5-continued

| Ingredient | Sample No. 618-125 | | | | | | | |
|---|---|---|---|---|---|---|---|---|
| | A | B | C | D | E | F | G | H |
| Tris(2-ethylhexyl)phosphate | — | — | — | 0.5 | — | — | — | 0.5 |

[1] Marketed by Morton Thiokol, Inc.
[2] Markted by Atla-Medine, Inc.

TABLE 6

| Ingredient | Sample No. 618-137 | | | | | | | |
|---|---|---|---|---|---|---|---|---|
| | A | B | C | D | E | F | G | H |
| Vista 5415 PVC | 100 | 100 | 100 | 100 | 100 | 100 | 100 | 100 |
| ELVALOY ® EP 4015 | 75 | 75 | 75 | 75 | 75 | 75 | 75 | 75 |
| Bisphenol A | 0.5 | 0.5 | 0.5 | 0.5 | 0.5 | 0.5 | 0.5 | 0.5 |
| Drapex 6.8 (ESO)[1] | 5 | 5 | 5 | 5 | 5 | 5 | 5 | 5 |
| Mark 4727 (Ba/Zn Stabilizer)[2] | 3 | 3 | 3 | 3 | — | — | — | 1 |
| Barium Stearate | — | — | — | — | 1.75 | 1.75 | 1.75 | 1.75 |
| Zinc Stearate | — | — | — | — | 0.25 | 0.25 | 0.25 | 0.25 |
| Rhodiastab 83[3] | — | — | — | — | 1 | 1 | 1 | 1 |
| Alcamizer 1[4] | — | — | — | — | 0.5 | 0.5 | 0.5 | 0.5 |
| Stearic Acid | 1 | 1 | 1 | 1 | 1 | 1 | 1 | 1 |
| $H_3PO_4$ | 0.5 | — | — | — | 0.5 | — | — | — |
| VANFRE* UN | — | 0.5 | — | — | — | 0.5 | — | — |
| Bis(2-ethylhexyl)hydrogen phosphate | — | — | 0.5 | — | — | — | 0.5 | — |
| Tris(2-ethylhexyl)phosphate | — | — | — | 0.5 | — | — | — | 0.5 |

[1] Epoxidized Soya Oil marketed by Argus, Brooklyn, New York.
[2] Marketed by Argus, Brooklyn, New York.
[3] 1,3-diphenyl-propane-1,3-dione marketed by Rhone-Poulenc, Inc., Monmouth Junction, New Jersey.
[4] Magnesium aluminum hydroxy carbonate hydrate marketed by Kyowa Chemical Industry Comp., Ltd.

TABLE 7

| Formulation | Degradation Time (sec) | | Equilibrium Torque (m-g) | |
|---|---|---|---|---|
| | 70 RPM | 85 RPM | 70 RPM | 85 RPM |
| Pb Stabilizers | | | | |
| 618-121A | 1252 | 276 | 1871 | 1980 |
| 618-121B | 808 | 210 | 2005 | 2151 |
| 618-121C | 604 | 181 | 2129 | 2237 |
| 618-121D | 503 | 163 | 2162 | 2162 |
| Sn Stabilizers | | | | |
| 618-125A | | 260 | | 1625 |
| 618-125B | | 508 | | 1711 |
| 618-125C | | 443 | | 1859 |
| 618-125D | | 473 | | 1757 |
| 618-125E | | 346 | | 1812 |
| 618-125F | | 529 | | 1788 |
| 618-125G | | 473 | | 1886 |
| 618-125H | | 544 | | 1819 |
| Ba/Zn Stabilizers | | | | |
| 618-137A | | 260 | | 1680 |
| 618-137B | | 720 | | 1489 |
| 618-137C | | 737 | | 1594 |
| 618-137D | | 668 | | 1626 |
| 618-137E | | 550 | | 1750 |
| 618-137F | | 812 | | 1754 |
| 618-137G | | 598 | | 1818 |
| 618-137H | | 641 | | 1901 |

As can be seen from Table 7, in the case of the tin and barium/zinc stabilized blends, only minor differences were observed in degradation times. Equilibrium torque in the tin stabilized blends did appear to improve somewhat with the more acidic phosphates, but no improvement was observed in the barium/zinc stabilized blends. These results would be expected since these non-lead stabilized systems are not subject to cross-linking during normal processing. It was unexpected, however, that the lead-stabilized blends, would experience such long degradation times and low equilibrium torque since lead stabilized systems are readily cross-linked under these processing conditions. Clearly, the use of the alkyl acid phosphates or phosphoric acid inhibits such lead induced cross-linking.

EXAMPLE 3

To determine optimum levels of a mixture of lubricant and the alkyl acid phosphate, blends containing high and low levels of ethylene terpolymer were prepared and varying amounts of alkyl acid phosphate and stearic acid incorporated into the blends. The two, base formulations used are shown in Table 8 below.

Base Formulations 1 and 2 were tested for stability time (measured in minutes), blooming (measured in % reflectance retained) and oven aging @7 days/136° C. (measured in % elongation retained).

To determine stability time, a Brabender torque rheometer with a 500 Haake mixing head bowl was employed. Conditions were at 185° C. and 85 rpm with a 65 g. charge. The charge material was individually hand-blended, calculated to a total weight of approximately 67-70 g.

For the blooming and over aging tests, hand blends were made and compounded on a two-roll mill. In the case of Base Formulation No. 1, all of the ethylene terpolymer was mixed into the hand blend, and the blend was fused on the mill at 365° F. and mixed for 5 minutes after banding. For Base Formulation No. 2, i.e., the higher ethylene terpolymer content formulation, 25% of the ethylene terpolymer was contained in the hand blend, and the blend was then fused on the mill at 340° F. and mixed for 2 minutes after banding. The remaining 75% of the ethylene terpolymer was then added to the melt and mixed for another 5 minutes.

TABLE 8

| Ingredient | Base Formulation 1 | Base Formulation 2 |
|---|---|---|
| Vista 5305 PVC[1] | 100 | 100 |
| ELVALOY ® EP4015 | 20 | 70 |
| Paraloid K-120N[2] | 5 | 5 |
| Irganox 1035[3] | 0.2 | 0.2 |
| Drapex 6.8[4] | 8 | 8 |
| Dythal Envirostab[5] | 6 | 6 |

TABLE 8-continued

| Ingredient | Base Formulation 1 | Base Formulation 2 |
|---|---|---|
| DLTDP[6] | 0.4 | 0.4 |
| VANFRE* UN | Design Specific | Design Specific |
| Stearic Acid | Design Specific | Design Specific |

[1]Marketed by Vista Chemical Company.
[2]Acrylic processing aid marketed by Rohm and Haas Company.
[3]Thiodiethylene bis(3,5-di-tert-4-hydroxyhydrocinnamate) marketed by Argus, Inc.
[4]Epoxidized soya oil marketed by Argus, Inc.
[5]Lead phthalate marketed by Anzon, Inc.
[6]Di-lauryl-di-thio-dipropionate marketed by Argus, Inc.

6"×6"×0.35" plaques were compression molded for the blooming tests and the plaques cut in half. One half was kept at 23° C./50% humidity, and the other half was hung in a 70° C. oven for 24 hours, then allowed to condition at 23° C./50% humidity for another 24 hours. Gloss readings were taken of the unaged and aged halves using a 60 degree glossometer. The percent response is the gloss reading after aging divided by the gloss reading before aging times 100.

6"×6"×0.72" plaques were compression molded for oven aging and testing performed according to ASTM D-638 and UL 1581 for 7 days at 136° C.

Resulting data from the tests can be found in Tables 9 and 10.

1. Results—Base Formulation 1

Low Level Ethylene Terpolymer

Referring to Table 9, with respect to stability time, it can be seen that the higher the level of the alkyl acid phosphate, the longer the stability time.

As can also be seen from the data in Table 9, mid-range levels of the alkyl acid phosphate (~1.0–1.3 phr) could be coupled with the total range of stearic acid (0–2.0 phr) to give the highest percent retained reflectance. Conversely, a mid-range level of stearic acid (~0.8–0.9 phr) could also be combined with the total range of alkyl acid phosphate (0–2.0 phr) to achieve the same results. No visible exudation was observed on the plaques.

As can further be seen from the data in Table 9, and with respect to oven aging, differences in the relative amounts of the alkyl acid phosphate and the stearic acid show little effect.

In general, at relatively low levels of the ethylene terpolymer such as shown in Base Formulation No. 1, alkyl acid phosphate levels above 1.0 phr and lubricant (stearic acid) levels below 1.0 phr would appear to give optimum results as to stability time (>35 minutes), blooming (>99% retained reflectance) and oven aging (>90% retained elongation).

2. Results—Base Formulation 2

High Level Ethylene Terpolymer Level

As can be seen from the data in Table 10, the more alkyl acid phosphate present, the longer the stability time. As can also be seen, at alkyl acid phosphate levels of approximately 1.3 phr and above, either very low (0.25 phr or less) or very high (1.3 phr or more) levels of stearic acid were necessary to achieve the longest stability times.

TABLE 9

| VANFRE UN PHR | Stearic Acid PHR | Stab. Time Minutes | Blooming % | Oven Aging % Ret. Elon. |
|---|---|---|---|---|
| 1.5000 | 0.5000 | 37.700 | 99.70 | 93.70 |
| 1.0000 | 2.0000 | 40.200 | 99.20 | 86.00 |
| 1.0000 | 1.0000 | 34.900 | 100.00 | 90.10 |
| 1.0000 | 1.0000 | 35.400 | 99.50 | 98.30 |
| 0.5000 | 1.5000 | 30.800 | 101.00 | 94.80 |
| 2.0000 | 1.0000 | 45.200 | 97.30 | 92.50 |
| 0.0000 | 1.0000 | 21.800 | 101.00 | 91.50 |
| 1.0000 | 1.0000 | 35.400 | 99.50 | 96.30 |
| 1.0000 | 1.0000 | 35.800 | 99.70 | 88.40 |
| 0.5000 | 0.5000 | 35.050 | 97.60 | 93.50 |
| 1.0000 | 1.0000 | 38.500 | 99.70 | 94.40 |
| 1.0000 | 0.0000 | 37.000 | 99.10 | 104.00 |
| 1.5000 | 1.5000 | 38.100 | 97.70 | 97.70 |

TABLE 10

| VANFRE UN PHR | Stearic Acid PHR | Stab. Time Minutes | Blooming % | Oven Aging % Ret. Elon. |
|---|---|---|---|---|
| 1.5000 | 0.5000 | 30.500 | 98.20 | 82.400 |
| 1.0000 | 2.0000 | 32.200 | 99.30 | 69.300 |
| 1.0000 | 1.0000 | 29.800 | 98.50 | 72.200 |
| 1.0000 | 1.0000 | 29.400 | 95.40 | 87.400 |
| 0.5000 | 1.5000 | 24.000 | 98.50 | 69.200 |
| 2.0000 | 1.0000 | 36.700 | 96.40 | 79.000 |
| 0.0000 | 1.0000 | 8.600 | 91.80 | 61.000 |
| 1.0000 | 1.0000 | 32.600 | 98.90 | 80.100 |
| 1.0000 | 1.0000 | 31.700 | 99.80 | 85.600 |
| 0.5000 | 0.5000 | 22.000 | 96.50 | 80.500 |
| 1.0000 | 1.0000 | 27.900 | 97.90 | 81.000 |
| 1.0000 | 0.0000 | 36.000 | 96.00 | 88.800 |
| 1.5000 | 1.5000 | 35.200 | 97.90 | 82.300 |

With regard to blooming, in general it can be seen that blooming values increase as levels of both alkyl acid phosphate and stearic acid increase. However, little total overall difference appears from varying the relative amounts of the two ingredients.

As to oven aging, both the levels of the alkyl acid phosphate and stearic acid are significant. As can be seen, a mid range of alkyl acid phosphate (~0.4–1.4 phr) with a low-range level of stearic acid (~0.5 phr or less) appears to be best.

Disregarding blooming results, optimum results as to stability time and oven aging would appear to be achieved with alkyl acid phosphate levels of about 1.0 to 1.9 phr with stearic acid levels of about 0 to 1.5 phr. Levels of these ingredients would give stability time of greater than 30 minutes and oven aging greater than 80% retained elongation.

The data above establishes that the formulations of the present invention are ideally suited for making lead-stabilized, flexible polymeric products. In particular, the blends can be used to make coatings and jackets for wire and cable. The unique combination of the alkyl acid phosphate and stearic acid as a lubricant package permits the use of commonly employed (and mainly preferred) lead stabilizers without deleterious cross-linking that normally occurs with the use of such lead stabilizers. Accordingly, the blends retain their processibility and stability.

What is claimed is:

1. A flexible stabilized polymeric composition comprising:
   from about 10 to about 90 parts per hundred parts of resin of a polyvinylchloride;
   from about 10 to about 90 parts per hundred parts of resin of a copolymer of ethylene, carbon monoxide and a copolymerizable monomer selected from the group consisting of esters of unsaturated mono- or dicarboxylic acids of 2 to 20 carbon atoms, vinyl esters of saturated carboxylic acids wherein the acid group has from 1–18 carbon atoms and mixtures thereof;

an effective amount of a lead-based stabilizer; and from about 0.1 to about 3 parts per hundred parts of resin of an inhibitor selected from the class consisting of phosphoric acid, alkyl acid phosphate wherein the alkyl group contains from about 6 to about 20 carbon atoms and mixtures thereof, the pH of a 1 percent by weight dispersion of said alkyl phosphate in deionized water ranging from about 2 to about 3.

2. The composition of claim 1 wherein said copolymer comprises ethylene, carbon monoxide and butyl acrylate.

3. The composition of claim 2 wherein ethylene is present in an amount of about 40 to about 80 percent by weight, carbon monoxide is present in an amount of from about 3 to about 30 percent by weight, and butyl acrylate is present in an amount of from about 5 to about 60 percent by weight.

4. The composition of claim 1 wherein said copolymer comprises ethylene, carbon monoxide and vinyl acetate.

5. The composition of claim 1 including a lubricant comprising a fatty acid containing from 14 to 22 carbon atoms.

6. The composition of claim 5 wherein said lubricant is present in an amount of from about 0.1 to about 3 parts per hundred of resin.

7. The composition of claim 6 wherein said fatty acid is stearic acid.

8. The composition of claim 6 wherein said alkyl acid phosphate comprises an unneutralized fatty alcohol acid phosphate.

9. The composition of claim 1 wherein said lead stabilizer is present in an amount of from about 2 to about 15 parts per hundred of resin.

* * * * *